United States Patent [19]

Burns et al.

[11] Patent Number: 5,550,516
[45] Date of Patent: Aug. 27, 1996

[54] INTEGRATED RESONANT MICROBEAM SENSOR AND TRANSISTOR OSCILLATOR

[75] Inventors: David W. Burns; J. David Zook, both of Minneapolis, Minn.

[73] Assignee: Honeywell Inc., Minneapolis, Minn.

[21] Appl. No.: 357,943

[22] Filed: Dec. 16, 1994

[51] Int. Cl.⁶ .............................. G01L 1/10; H03B 5/30
[52] U.S. Cl. .................. 331/65; 331/116 M; 331/156; 73/778; 73/862.59
[58] Field of Search ................................ 331/116 M, 65, 331/156; 73/778, 862.59

[56] References Cited

U.S. PATENT DOCUMENTS

| 4,901,586 | 2/1990 | Blake et al. | 73/862.59 |
| 5,090,254 | 2/1992 | Guckel et al. | 73/862.59 |
| 5,275,055 | 1/1994 | Zook et al. | 73/778 |

OTHER PUBLICATIONS

H. Nathanson et al.,"The Resonant Gate Transistor", Mar. 1967, *Transactions on Electron Devices*, vol. ED–14 No. 3, (IEEE), pp. 117–133.

W. Newell,"Miniaturization of Tuning Forks", Sep. 27, 1968, *Science* vol. 161, pp. 1321–1327.

W. Newell et al.,"The Tunistor: A Mechanical Resonator for Microcircuits", Sep. 1969, *IEEE Transactions on Electron Devices*, vol. ED–16, No. 9, pp. 781–787.

K. Ikeda et al.,"Silicon Pressure Sensor Integrates Resonant Strain Gauge on Diaphragm", 1990, *Sensors and Actuators*, A21–A23, pp. 146–150.

J. Zook et al.,"Characteristics of Polysilicon Resonant Microbeams", 1992, *Sensors and Actuators*, A35, pp. 51–59.

*Primary Examiner*—Siegfried H. Grimm
*Attorney, Agent, or Firm*—John G. Shudy, Jr.

[57] ABSTRACT

At least one microbeam situated on a substrate, having a resonant frequency dependent on the strain on the microbeam which may be affected by the bending of the substrate. The beam or beams have sense and drive electrodes proximate to the beam or beams and form capacitors with a beam being the other electrode. The capacitance varies as the beam moves in vibration. The sense electrode is connected to an input of a transistor, such as the gate or base, and the drive electrode is connected to an output of the transistor. The transistor has a load impedance with a capacitive component to aid in the sustaining of vibration of the beam at a resonant frequency. A high ohm resistor is connected between the gate and the drain of the transistor to appropriately bias the gate. The bending of the substrate may be caused by a magnitude of a physical stimulus being measured. However, the bending of the substrate is not utilized nor desired in the filter and temperature sensing configurations of the invention. The frequency of resonance is an indication of the magnitude of the physical parameter. Variants of the sensor may be implemented with different placements of the sense and drive electrodes, and additional electronics as needed to implement the various configurations and microbeam geometry. Additional sense and/or drive electrodes and beams also may be incorporated in the transistor resonant microbeam sensor.

14 Claims, 12 Drawing Sheets

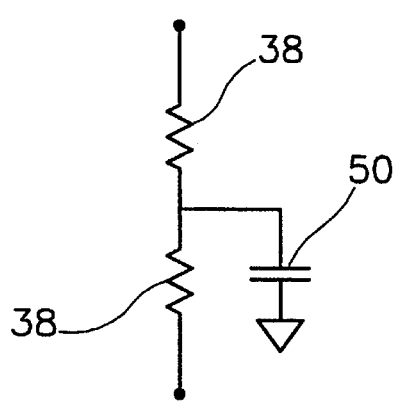
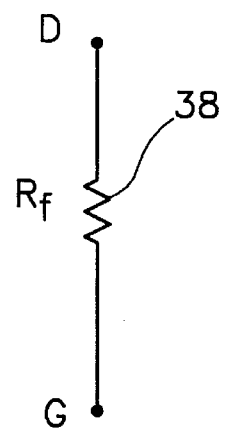
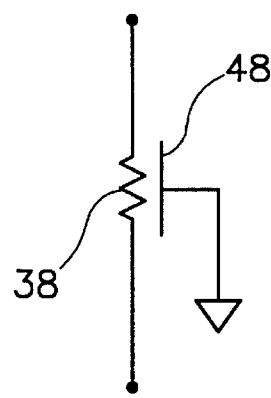
Fig.4         Fig.5a         Fig.5b
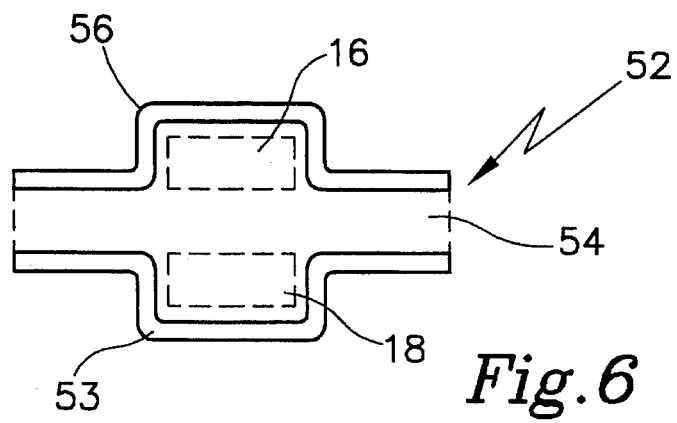
Fig.6
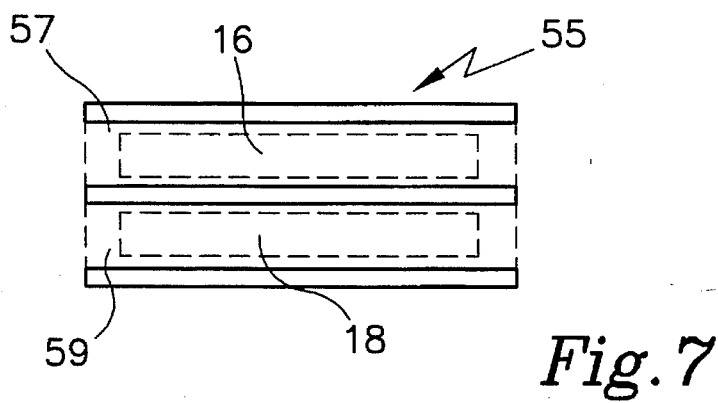
Fig.7

INTEGRATED RESONANT MICROBEAM SENSOR AND TRANSISTOR OSCILLATOR

BACKGROUND OF THE INVENTION

The invention pertains to resonant sensors, and particularly to resonant integrated microbeam sensors (RIMS). More particularly, the invention pertains to integrated transistor and RIMS oscillators.

A single transistor-resonant microbeam device was developed for narrow-band filter applications in the 1960's, and was called the "resonant gate transistor", or "RGT". In the case of the RGT, an integrated oscillator (self-resonance) was demonstrated, but it required the use of two RGT devices tuned to the same frequency. Both devices revealed a 90 degree phase shift at resonance, and the additional 180 degree phase shift was obtained by applying the signal to the beam of one, rather than on the drive electrode. The analysis of the resonant gate transistor is basically applicable to the invention, and shows that even if the actual voltage gain of the transistor-resonant microbeam pair is less than unity, the overall open loop gain can be greater than unity, because the electrostatic drive and capacitive sensing of the vibrating element essentially amplifies the input voltage by a factor of Q at the resonant frequency.

SUMMARY OF THE INVENTION

The present invention is a simple, low-cost means for driving a resonant integrated microbeam sensor at resonance, which uses a single transistor that may be fabricated on the chip next to the RIMS device. The microbeam is conducting and is at ground potential, while the drive and sense electrodes are typically on opposite sides of the resonant microbeam.

The present invention may also be used as a narrow band pass filter, by applying an input voltage to the drive electrode and taking the output at the drain or collector, instead of closing the loop for self-resonance. The advantage of the present device is that the transistor and the resonant microbeam are cofabricated, yet with processes optimized for each one. The main difference with previous RIMS devices (U.S. Pat. No. 5,275,055, by Zook et al. and issued Jan. 4, 1994, which is hereby incorporated by reference) is that the drive and the sense electrodes are positioned oppositely with respect to the beam, so that the capacitance of one decreases when the capacitance of the other increases, which allows self-resonance. The present structure makes it possible to take advantage of the greater-than-unity gain to realize a resonant strain transducer which can be augmented by an appropriate microstructure to measure pressure, acceleration, force and other applied stimuli.

Previous RIMS sensors were based on the use of piezoresistors to sense a deflection of the microbeam. The present invention is based on the use of capacitive sensing of the microbeam displacement, using a transistor, which in turn, drives the beam to maintain self-resonance. (The terms "microbeam" and "beam" are sometimes used interchangeably in this specification.) The use of a high DC impedance feedback resistor is also used to bias the amplifier into a linear region. Even though the transistor RIMS device requires cofabrication of a transistor on the same chip as the resonant microbeam, the whole fabrication is hardly more complicated than the piezoresistive RIMS structure since the piezoresistors are omitted.

The present invention, utilizing a much simpler polysilicon process, has the advantage that there is no sense current and consequent $i^2R$ heating of the beam. This is a general advantage of a capacitive drive/sense approach over the piezoresistive approach.

In summary, the device is a microelectromechanical oscillator consisting of a mechanically vibrating member, two electrodes and a transistor structure, such that the frequency of the oscillator is determined by the frequency of vibration of the mechanical element. The two electrodes are preferably oppositely located with respect to the vibrating beam or member. One electrode is connected to the input of the transistor and the other is connected to the output of the transistor. Electrostatic drive and capacitive sense are concurrently used to operate the resonant microbeam strain sensing element at its resonant frequency.

Resonant integrated microsensors allow sensor technology to catch up with the state of the art in digital electronics. The philosophy which has driven nearly all signal processing into the digital world is that it is far easier to handle and maintain the accuracy of information that is in one of two states, i.e., digital, rather than an analog signal. The RIMS device achieves this goal by directly converting the sensed variable into a switched signal, thereby eliminating the errors in drift caused by analog circuitry. The sensed information is contained in the frequency of the switching.

An example of such sensor is the RIMS sensor. Recent advances in the formation of three-dimensional silicon microstructures by micromachining techniques allow the fabrication of vacuum encapsulated polysilicon microbeams. The resonant frequency of the microbeam depends on its geometrical and mechanical properties, and is independent of its electrical properties. The resonant frequency, however, changes if the strain on the beam changes, much like the pitch of a string on a musical instrument changes with loosening or tightening. Any strain that is coupled into the microbeam through the sensor structure results in a change in frequency of the sensor output. This quasi-digital signal is buffered and fed directly into a control system without intervening complex analog-to-digital (A/D) conversion. Depending on the design of the microstructure formed monolithically with the microbeam, the induced strain can be caused by and not limited to pressure, acceleration, temperature, air flow or humidity.

The silicon resonant microbeam approach has the capability of excellent accuracy, stability and dynamic range. RIMS devices have been shown to demonstrate extremely high quality (Q) factors greater than 100,000, and long term frequency stability (several parts per million (ppm) after several years). Further, such sensors have demonstrated large frequency shifts with applied strain ($\Delta f/f > 1400*\Delta l/l$) which provides excellent sensor responsivity. Thus the RIMS sensor can be used to sense a large number of physical and environmental variables over a large dynamic range with high sensitivity and with unprecedented long-term stability, while providing a direct input signal to digital circuits. RIMS oscillators directly provide a frequency output which is highly desirable for high performance digital sensors. Conversion from electrical frequency to digital data can be performed by a direct counter and a reference clock. This combination is generally recognized as the simplest, most accurate and the most cost-effective analog to digital conversion process. Furthermore, the variable frequency output can be transmitted over distances without error and is nearly free of drift, distortion and external interference. A resonant sensor inherently converts the sensed variable to frequency thus improving simultaneously the simplicity, the reliability and discrimination compared to traditional A/D approaches. An intrinsic digital readout is well suited to present day digital control systems.

Resonant sensors have been used for many years to achieve high-accuracy measurements. The RIMS approach has significant advantages over other resonant sensors, such as quartz crystal oscillators, because the RIMS structure is entirely monolithic silicon-and has no other materials (i.e., piezoelectric, magnetic or metallic) associated with it. The RIMS structure is annealed typically at high temperatures (e.g., ≈950° Centigrade (C.)) making it completely stable with no creep or stress relaxation over normal sensor operating temperatures (−50 degrees to +150 degrees C.) and beyond.

BRIEF DESCRIPTION OF THE DRAWINGS

FIG. 1b is a diagram of the equivalent circuit for the electronics of FIG. 1a.

FIG. 2b is a side view of the beam element of the device in FIG. 2a.

FIG. 4 shows a feedback resistor having a center tap capacitively coupled to ground.

FIGS. 5a and 5b show two other variants of the feedback resistor.

FIG. 6 exhibits a wing-like resonant beam.

FIG. 7 reveals a lightly coupled dual beam resonator.

DESCRIPTION OF THE EMBODIMENTS

Figure 1A:
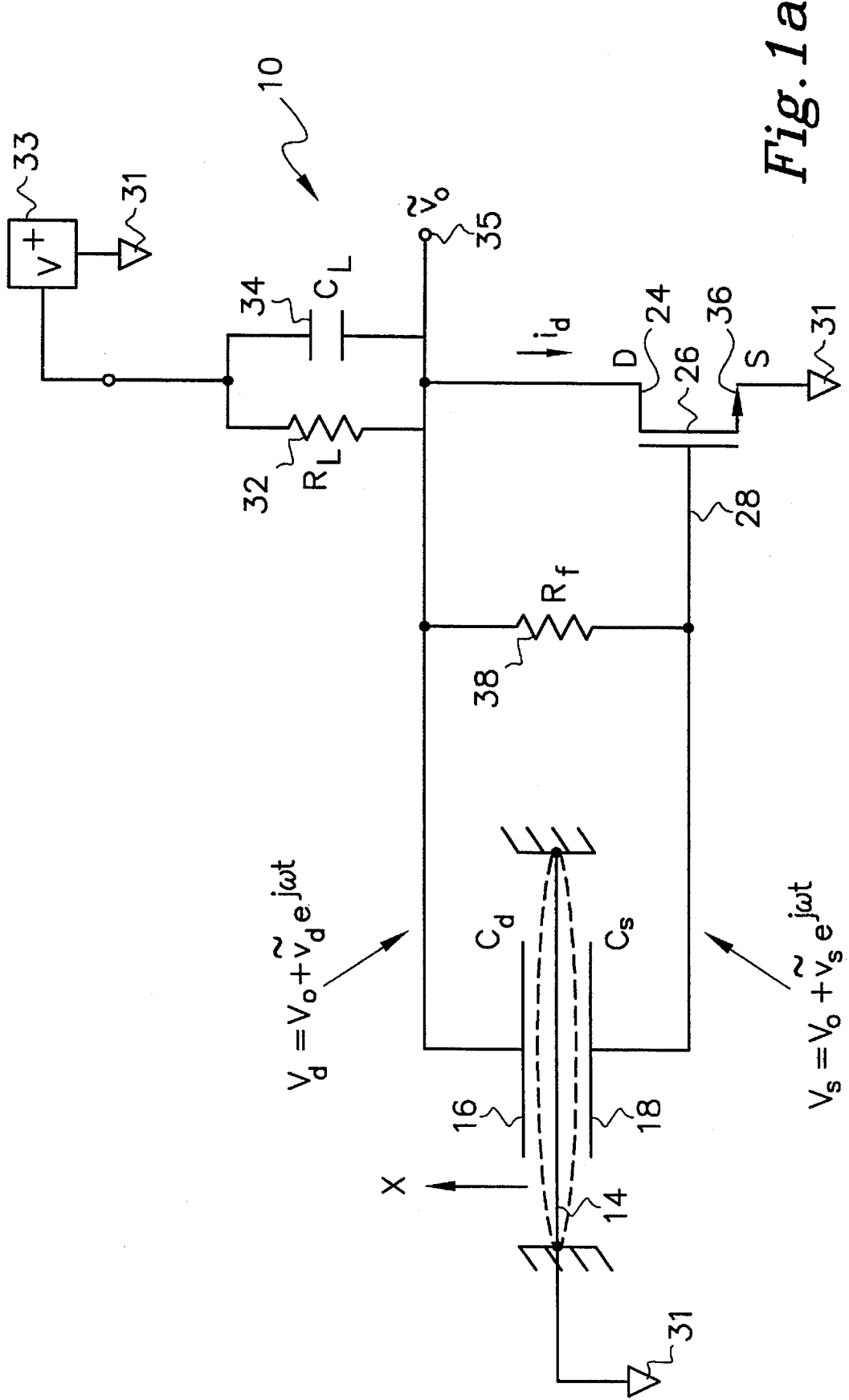
FIG. 1a is a schematic of the electronics for a single beam, single transistor RIMS.
Figure 1B:
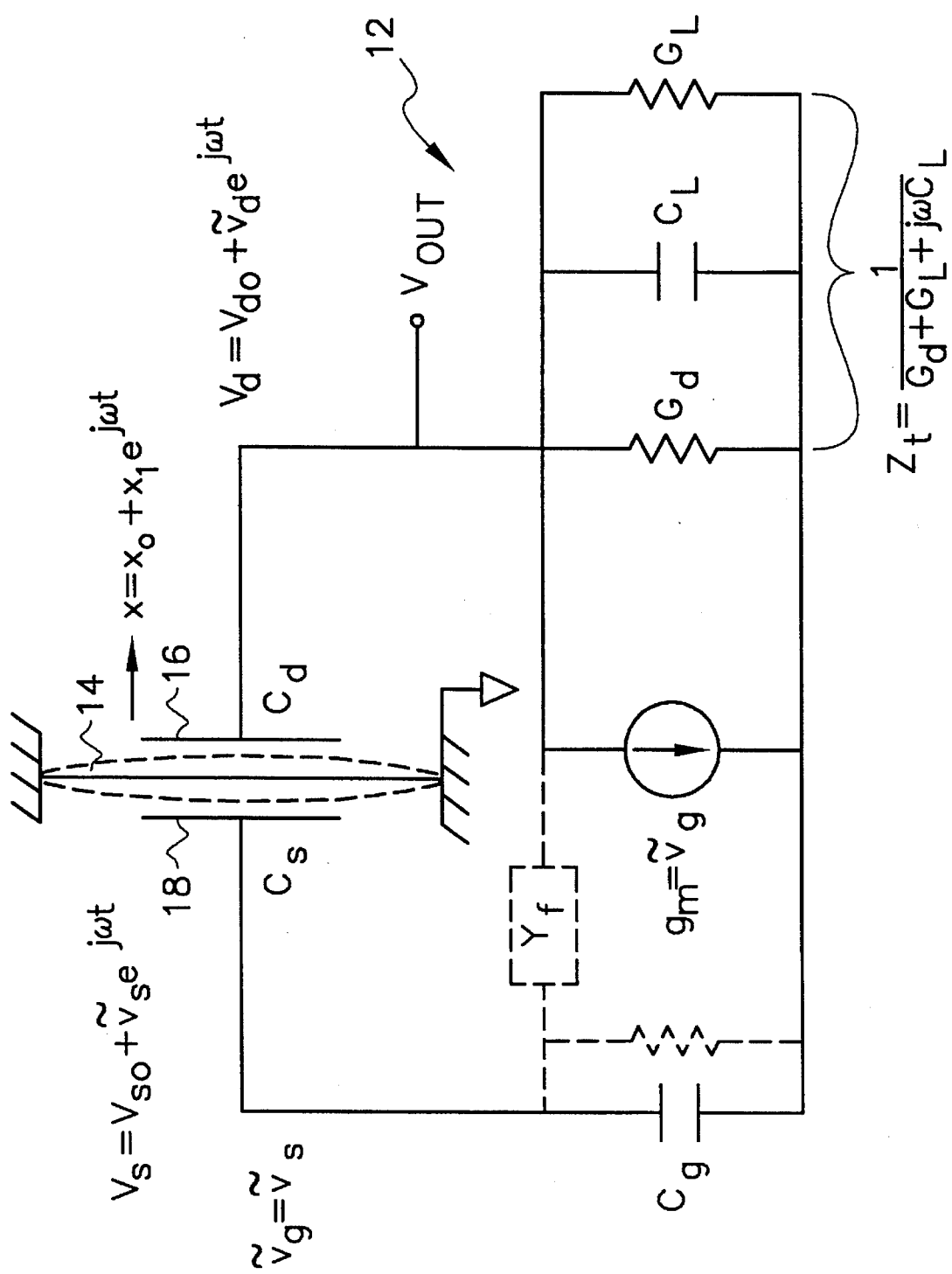

FIG. 1a is a schematic diagram of transistor RIMS device 10. An equivalent circuit 12 is shown in FIG. 1b. A resonant microbeam 14 is shown as a grounded beam structure, in that beam 14 is electrically connected to a reference terminal or ground 31. An electrostatic drive electrode 16 and a capacitive sense electrode 18 are positioned on opposite sides of beam 14. Sense electrode 18 senses the motion or vibration of beam 14 through the change of capacitance between beam 14 and sense electrode 18 wherein electrode 18 and beam 14 effectively form the electrodes of capacitance $C_s$ which varies according to distance between beam 14 and electrode 18, during beam 14 vibration. A signal indicating the relationship between beam 14 and electrode 18 is fed to gate 28 of FET 26. Drive electrode 16 is connected to drain 24 which is at an output 35 of circuit 10. Output 35 provides a drive signal to electrode 16 so as to electrostatically drive into motion and sustain vibration of beam 14 at its resonant frequency. The structure and relationship of drive electrode 16 to beam 14 and corresponding capacitance $C_d$ is like that of sense electrode 18 to beam 14. Drain 24 of FET 26 is connected to one end of a load impedance which consists of a load resistor 32 and load capacitor 34 connected in parallel. The other end of the load impedance is connected to a voltage supply V+ 33. The values of load resistor 32 and load capacitor 34 are related to the resonant frequency range of beam 14, which is dependent in part on the positive and/or negative tension applied to beam 14. The signal at output 35 of circuit 10 is 180 degrees out of phase with its input at gate 28. That is so because electrodes 18 and 16 are positioned at opposite sides of beam 14 rendering the distance relationship of the effective capacitive electrode pairs 14 and 18, and 16 and 18, respectively, at 180 degrees out of phase. Source 36 of FET 26 is connected to a reference terminal or ground 31. A feedback impedance 38 has one end connected to drain 24 and the other end connected to gate 28 of FET 26. Feedback impedance 38 provides a certain amount of negative feedback resulting in a stabilization of a gate bias to FET 26 so that FET 26 functions in a desired region of its performance characteristics. Feedback impedance 38 may be a resistor having a value on the order of about $10^8$ ohms. The output of circuit 10 may be monitored at output 35. The description of the present invention is in the context of a field effect transistor or transistors; however, the invention also may be implemented with a bipolar transistor or transistors, or a combination of field effect and bipolar transistors.

Figure 1C:
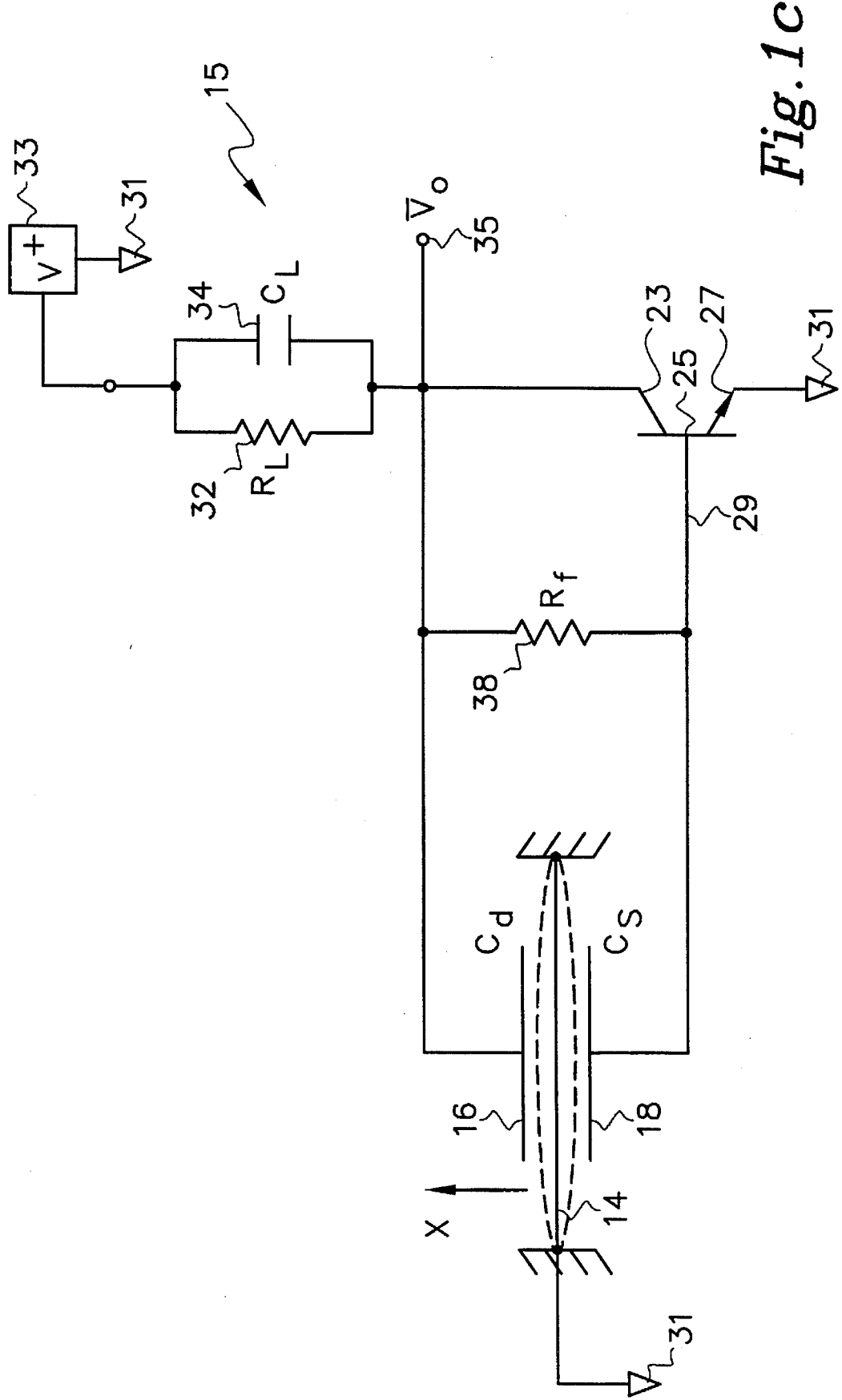
FIG. 1c is a schematic of the electronics of the transistor RIMS incorporating a bipolar transistor.

FIG. 1c shows a circuit 15 like that of FIG. 1a except that circuit 15 has a bipolar transistor 25 instead of FET 26. In lieu of gate 28, drain 24 and source 36 of FET 26, there is a base 29, a collector 23 and an emitter 27 of bipolar transistor 25, in that order.

Figure 2A:
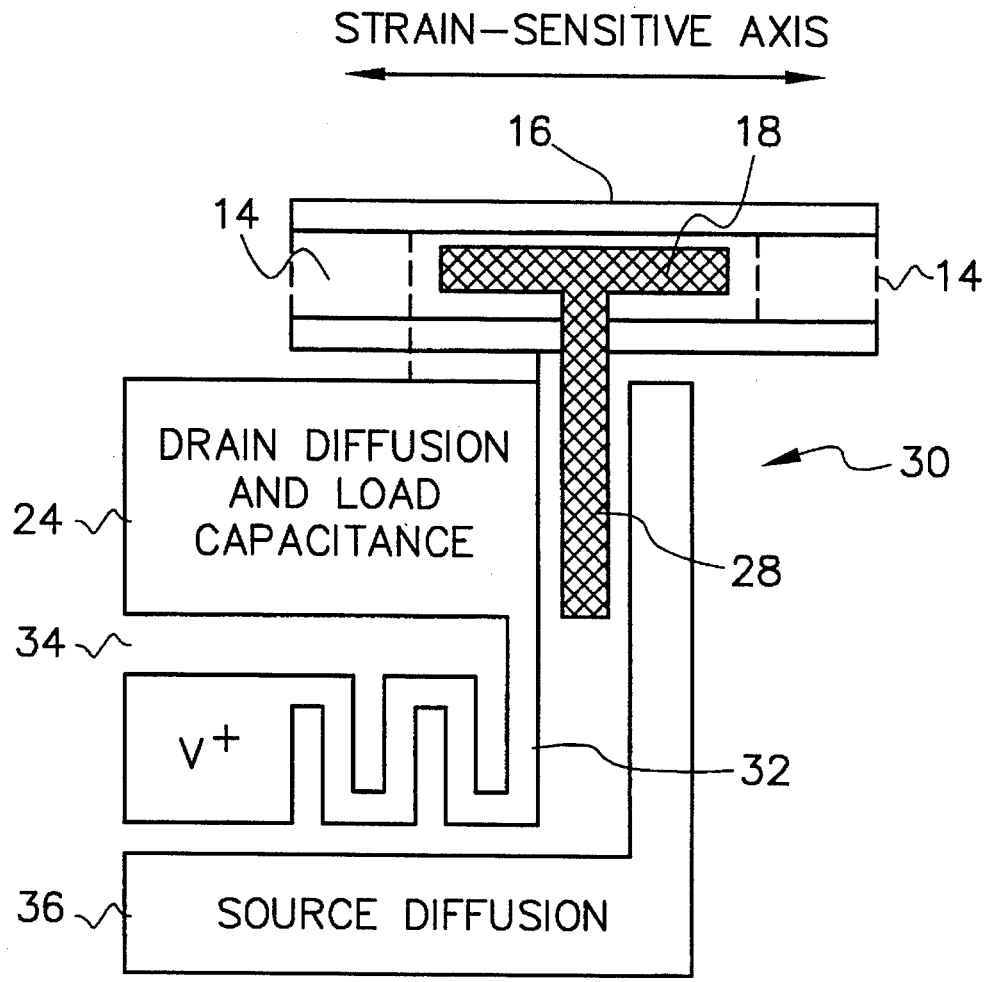
FIG. 2a is a top view of the single transistor and single beam RIMS on a silicon integrated circuit.
Figure 2B:
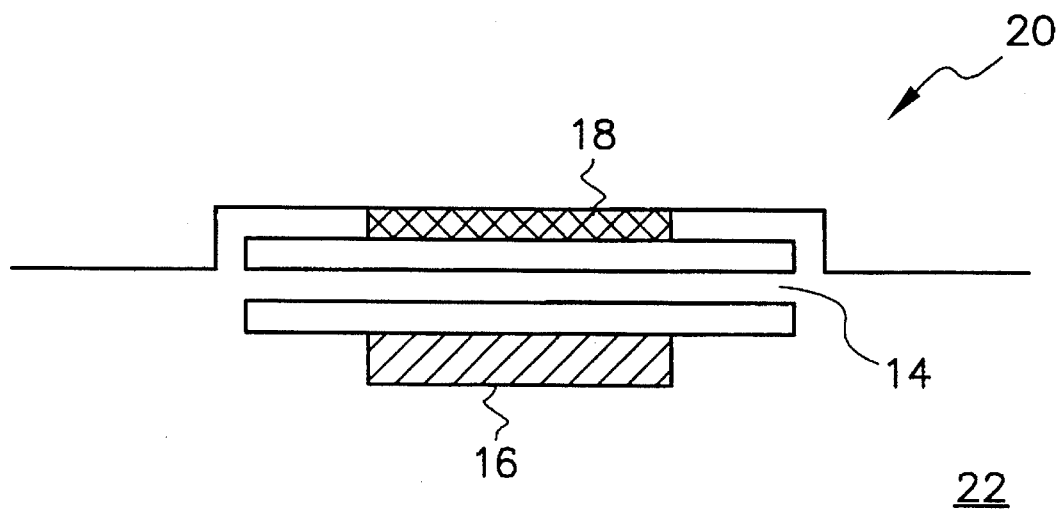

FIG. 2a shows a top view of a transistor RIMS layout 30 and FIG. 2b shows a cross section of RIMS structure 20 having n-type conducting beam 14, a p-n junction drive electrode 16 in substrate or underlying epitaxial item 22, and an ion-implanted sense electrode 18 in the shell. Although the roles of the two electrodes, 16 and 18, could be interchanged, the arrangement of FIGS. 2a and b is chosen because electrode 16 and substrate 20 have more capacitance to ground, and the arrangement is thus more suitable for driving beam 14. Load capacitance 34 is deliberately increased by the use of a large drain 24 electrode. Sense electrode 18 should have low capacitance to ground and is shown as a shallow implant into the undoped polyshell which is tied to the gate of adjacent transistor 24. The DC leakage resistance of the polysilicon provides a DC bias at gate 28 at the drain 24 potential, but does not provide a feedback capacitance that could lower the AC gain because of negative feedback. There is a diffusion for source 36 and drain 23, respectively.

The feature of the design shown in FIGS. 2a and 2b is that the conducting beam 14 provides a ground plane between the sense 18 and drive 16 electrodes. The shielding action of the ground plane prevents direct capacitor-coupled voltage feedback that would lead to oscillation unrelated to mechanical motion of beam 14. With an ideally grounded beam 14, only the physical movement of beam 14 changes the sense capacitance and gives rise to an AC voltage on gate 28.

Figure 3:
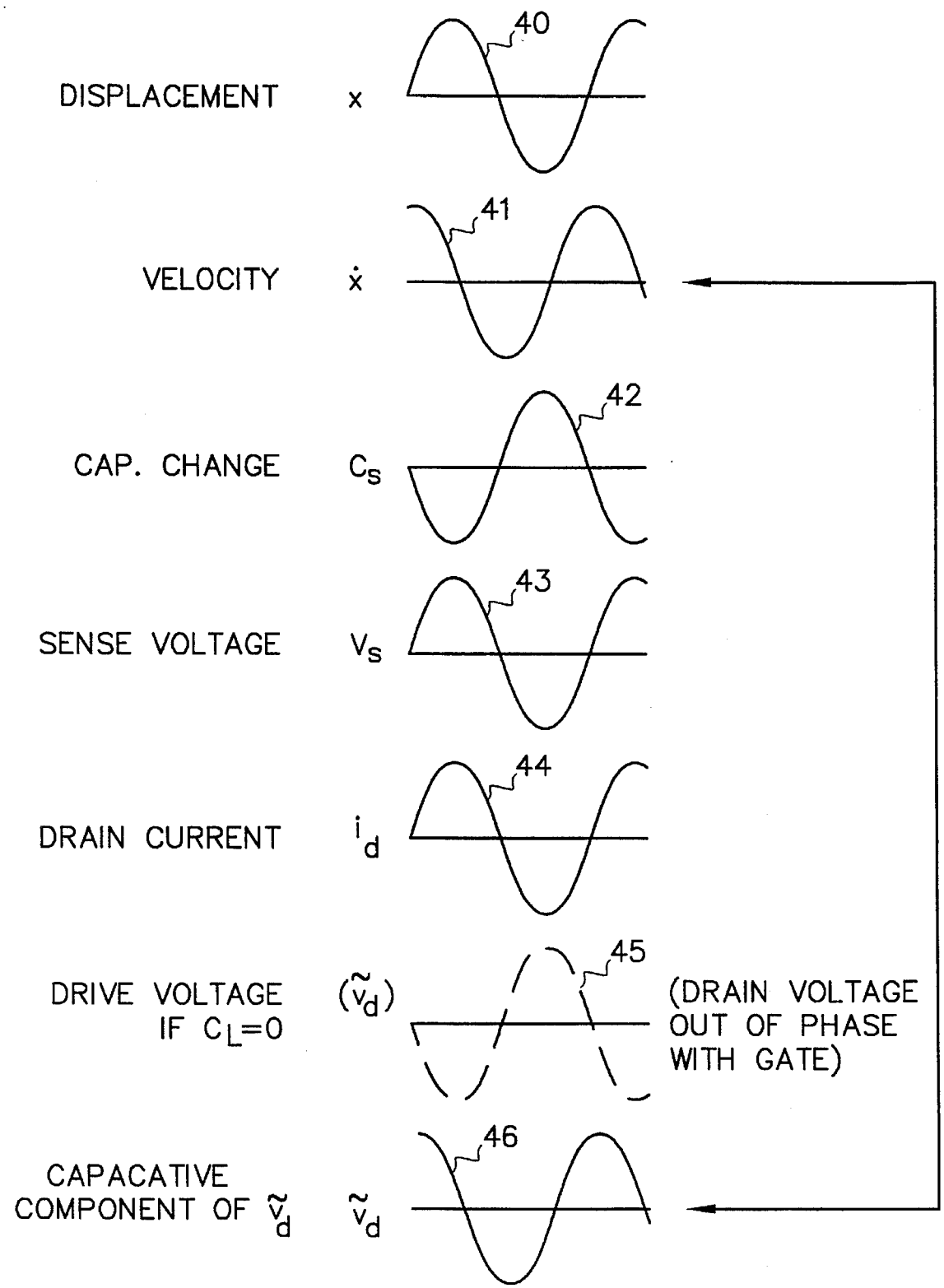
FIG. 3 is a waveform diagram showing phase relationships among the beam movements and electronic signals of the RIMS.

FIG. 3 shows the phase relationships of key signals at the various components. Feedback resistor 38 can be composed of undoped polysilicon, has a very high resistance of approximately $10^8$ ohms, and sets the DC voltage of gate 28 so that the transistor is turned on at a low current level near a threshold in a region of high gain of the transistor performance curve. Displacement x is taken to be positive when beam 14 is displaced toward drive electrode 16 (downward in FIG. 2a). Positive x displacement means a decrease in the sense capacitance since the gap of the sense capacitor is increased. FIG. 3 shows the phase relationships of the various physical and electrical activities of the RIMS oscillator. Curve 40 reveals the displacement x and curve 41 reveals the velocity $\dot{x}$. The capacitive change with respect to the sense capacitance is shown by curve 42. An assumption is that the AC impedance of the sense/gate electrode to ground is very high, so that electrical charges are constant during a period of oscillation. Thus, a decrease in capacitance $C_s$ as shown by curve 42, means an increase in the sense voltage shown by curve 43. If there were no capacitive loading ($C_L=0$), the drain 24 or drive voltage $V_D$ which is shown by curve 45, would be 180 degrees out of phase with the gate voltage which is the same as the sense voltage as shown by curve 43. Also, under such conditions, drive voltage 45 is 180 degrees out of phase with the drain current as shown by curve 44. However, in the actual device, capacitive load 34 is not zero, thereby causing drive voltage 45 to lag. Thus, the capacitive component, as shown by curve 46, of the drive voltage 45 is in phase with velocity 41 of beam 14, which is the condition required to maintain oscillation of beam 14. FIG. 1b shows an equivalent circuit of the invention for purposes of analysis.

The applicable symbols include:

$$C_s = \frac{\epsilon_o A_s}{h_s + x} = \text{sense capacitance,}$$

$$C_d = \frac{\epsilon_o A_d}{h_s - x} = \text{drive capacitance,}$$

$V_s$ = sense DC voltage,
$V_d$ = drive DC voltage,
$\tilde{v}_s$ = complex sense voltage amplitude,
$\tilde{v}_d$ = complex drive voltage amplitude,
$C_g$ = effective gate capacitance,
$C_L$ = load capacitance,
$G_d$ = drain conductance,
$G_L$ = load conductance,
$Y_f$ = feedback admittance (negligible),
m = effective mass of microbeam,
k = mechanical stiffness of microbeam, $$r = \frac{m\omega_o}{Q} = \text{damping coefficient,}$$

$q_s$ = charge on sense electrode,
$q_d$ = charge on drive electrode,
$q_g$ = charge on gate electrode,
Im = imaginary part of a complex number, and
$h_b$ = beam thickness.

Basic equations include $$m\ddot{x} + r\dot{x} + kx = \frac{q_d^2}{2\epsilon_o A_d} - \frac{q_s^2}{2\epsilon_o A_s}, \quad (1)$$

$$V_d = \frac{q_d}{C_d} = \frac{q_d(h_s - x)}{\epsilon_o A_d} = \text{drive capacitor voltage,}$$

$$\tilde{v}_d = -g_m \tilde{v}_s Z_t \text{ for a small signal transistor,} \quad (2)$$

$$V_s = \frac{q_s}{C_s} = \frac{q_s(h_s + x)}{\epsilon_o A_s} = \text{sense capacitor voltage,}$$

$q_g = -q_s$ (approximate charge conservation), and $$\therefore \tilde{v}_s = \frac{C_s V_{so}}{(C_g + C_s)} \frac{x_1}{(h_s + x_1)} = \text{sense voltage.} \quad (3)$$

In a minimum Q analysis, one may derive the condition for resonance, by assuming a small signal case, and equating the $e^{j\omega t}$ terms in equation 1.

$$(-m\omega^2 + j\omega r + k)x_1 = \frac{C_d^2 V_{do}}{\epsilon_o A_d} \tilde{v}_d - \frac{C_s^2 V_{so}}{\epsilon_o A_s} \tilde{v}_s$$

Equate imaginary terms:

$$\omega r x_1 = \frac{C_d^2 V_{do}}{\epsilon_o A_d} Im(\tilde{v}_d) \quad (4)$$

Then combine (2), (3) and (4) to obtain $$\omega r x_1 = \frac{C_d V_{do}}{(h_d - x_o)} \frac{C_s V_{so} g_m Im(-Z_t)}{(C_g + C_s)(h_s + x_o)} x_1$$

To obtain a condition for resonance, let $\omega = \omega_o$ and $$r = \frac{m\omega_o}{Q};$$

$$\frac{m\omega_o^2}{Q} = \frac{C_d V_{do}}{(h_d - x_o)} \frac{C_s V_{so}}{(h_s + x_o)} \frac{g_m Im(-Z_t)}{(C_g + C_s)}$$

Let $x_o \ll h_d, h_s$, to obtain the minimum required Q; wherein $$Q_{min} = \frac{(C_g + C_s)kh_d h_s}{C_d C_s V_{do} V_{so}} \frac{1}{g_m Im(-Z_t)}. \quad (5)$$

Since $Z_t = \frac{1}{G_d + G_L + j\omega C_L}$, $Im(-Z_t) = \frac{\omega C_L}{(G_d + G_L)^2 + \omega^2 C_L^2}$.

(Note that equation (5) neglects the electrical feedback through $Y_f$=drain-to-gate admittance.)

The following is a numerical example utilizing equation 5, wherein:

$$C_g = C_s = C_d = C_o,$$

$$h_s = h_d, A_s = A_d = \frac{1}{2} A_b,$$

$$h_d = h_s = h_b = h,$$
$$V_{do} = V_{so} = V_o,$$
$$k = m\omega_o^2 = \rho A_b h_b \omega_o^2,$$

$$\omega_o^2 = \frac{42E}{\rho} \frac{h_b^2}{L^4},$$

$$G_d + G_L = \omega C_L = g_o,$$
$$\mu = g_m/g_o,$$

$$Q_{min} = 4 \frac{kh_b^2}{C_o V_o^2} \frac{g_o}{g_m},$$

$$Q_{min} = \frac{4}{\mu} \frac{kh^2}{C_o V_o^2} = \frac{8 \cdot 42}{\mu} \left(\frac{h}{L}\right)^4 \frac{Eh^2}{\epsilon_o V_o^2},$$

$E = 1.6 \cdot 10^{11}$ N/m$^2$,
$\epsilon_o = 8.85 \cdot 10^{-12}$ F/m; and
with $h = 1$ μm and $V_o = 1$ V, then $\dfrac{Eh^2}{\epsilon_o V_o^2} = 1.81 \cdot 10^{10}$;

so that $$Q_{min} = \dfrac{6.07 \cdot 10^{12}}{\mu}\left(\dfrac{h_b}{L}\right)^4.$$

If $\dfrac{L}{h_b} = 100$ and $\mu = 10$, then $Q_{min} = 6{,}070$.

In another example, $L/h_b=250$ and $\mu=0.1$ then $Q_{min}=16{,}000$. This example shows that the transistor voltage gain $\mu$ can be less than unity, and the device can still be self-resonant, because the transistor power gain still exceeds unity.

In the above derivation, the s and d subscripts refer to sense 18 and drive 16 electrodes, respectively. The basic mechanical equation is the equation of motion 1, where the force on beam 14 is written in terms of the charges on the drive 16 and sense 18 electrodes. These charges determine the voltages on the electrodes. The assumption of charge conservation leads to equation 3 which relates the sense voltage to the displacement amplitude $X_1$. The next set of equations shows how one leads directly to an equation for the minimum value of Q, the mechanical quality factor, required to maintain the oscillation. Equation 5 shows that decreasing the gap spacings $h_s$ and $h_d$, increasing the transconductance $g_m$ of the transistor, and increasing electrode bias voltages $V_{do}$ and $V_{so}$ minimizes the Q requirement. An example of the use of this equation is provided next.

There are various configurations which may be implemented. FIGS. 4, 5a and 5b show alternative equivalent circuits for feedback resistor 38. Feedback resistor 38, of FIG. 5a, which is approximately $10^8$ ohms and can be implemented using undoped polysilicon, preferably has the polysilicon isolated by nitride to avoid high impedance DC paths to ground, especially at high temperatures. In order to prevent drain-to-gate feedback, low AC impedance paths to ground should be provided. The capacitance of nitride provides such a distributed capacitance 48 as indicated in FIG. 5b, but it may be necessary to provide additional capacitance 50 as indicated in FIG. 4.

An alternate beam configuration 52 that may offer significant advantages is shown in FIG. 6. Configuration 52 uses a twisting or bending mode of beam 54 which has oppositely-located side plates 56 and 53 attached like the wings of an airplane. Drive electrode 16 and sense electrode 18 are both located facing the same side (i.e., both above or both below wings 56 and 53, respectively, so that one capacitor is decreasing while the capacitor on the opposite side is increasing. Thus, the phase relationship is the same when electrodes 16 and 18 are located above and below the beam as in FIG. 2. Beam 54 and localized regions of the shell above beam 54 are grounded, so that there is good electrical isolation between the drive electrode 16 and sense electrode 18 or between gate 28 and drain 24, as desired. The above-provided analysis applies in the case of configuration 52. The potential advantages of configuration 52 is that no p-n junction is required under the beam, coplanar electrodes on the shell are easily connected to the FET, less strain energy in the beam for a given shift in the drive or sense capacitance (although less strain sensitivity), and reduced end losses and consequently higher Q.

Another embodiment 55 uses coplanar drive 16 and sense 18 electrodes, as shown in FIG. 7. Configuration 55 uses two beams 57 and 59 that are weakly coupled through the supports at the ends, analogous to a tuning fork. In the antisymmetric mode of vibration, one beam moves up while the other beam moves down, and vice versa, that is, 180 degrees out of phase. The above previous analysis applies, and resonance can be maintained by a single transistor, by amplifying and feeding a signal from sense electrode 16 to drive electrode 18.

Figure 8A:
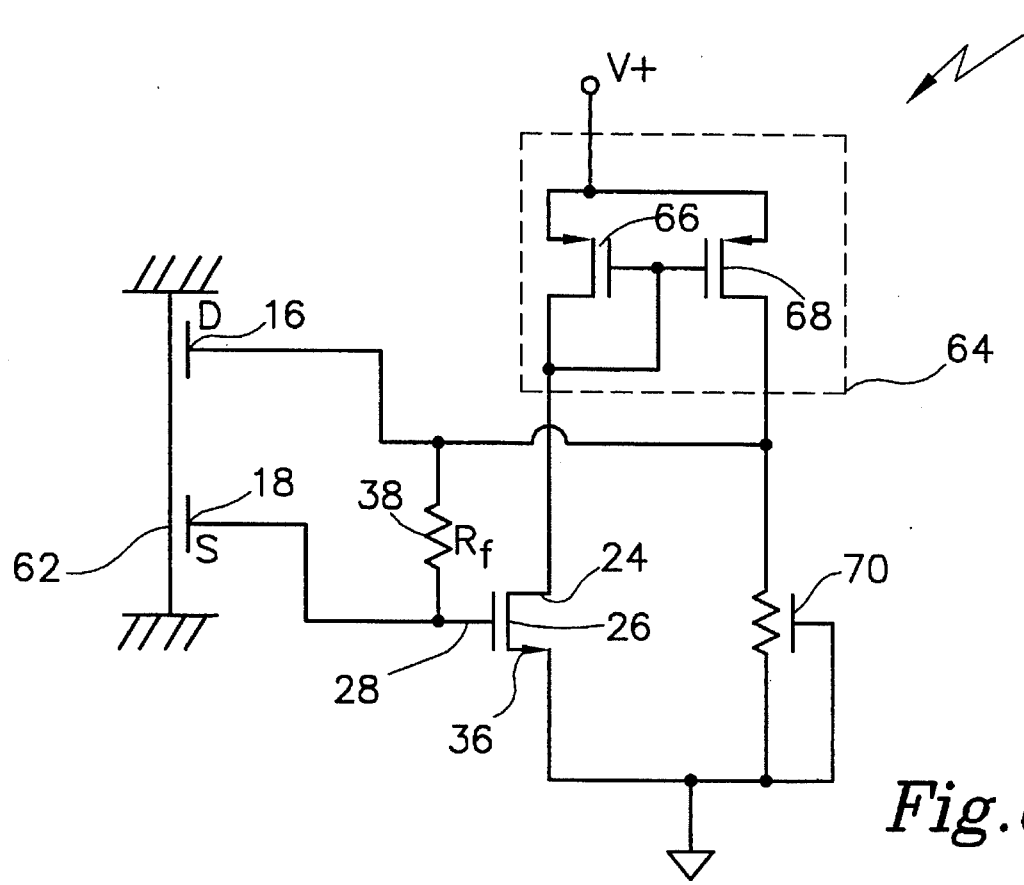
FIGS. 8a and 8b are schematics of electronics for a configuration having sense and drive electrodes situated on the same side of a single resonant beam.

Another embodiment 60 is illustrated in FIG. 8a. Drive electrode 16 and sense electrode 18 are located on the same side of beam 62, and the two capacitances of drive electrode 16 and sense electrode 18 change and are in phase with each other. The drive voltage of resonator 60 is opposite in phase to that of the above-noted embodiments. Additional stage 64 provides for the needed inverted signal for the drive electrode 16. Transistors 66 and 68 are P-channel metal-oxide semiconductor (PMOS) devices with a current mirror load which provides the additional phase change of 180 degrees. Transistor 26 is an n-channel transistor of the same kind of process. Load resistor and capacitor are connected between ground and transistor 68 with a drive electrode connected between transistor 68, and load resistor and capacitor 70. Complementary metal-oxide semiconductor (CMOS) technology may be used in the process of fabrication of device 60. Although the basic CMOS process requires several additional fabrication steps compared to the N-channel metal-oxide semiconductor (NMOS) technology process, it provides a higher degree of design flexibility.

Figure 8B:
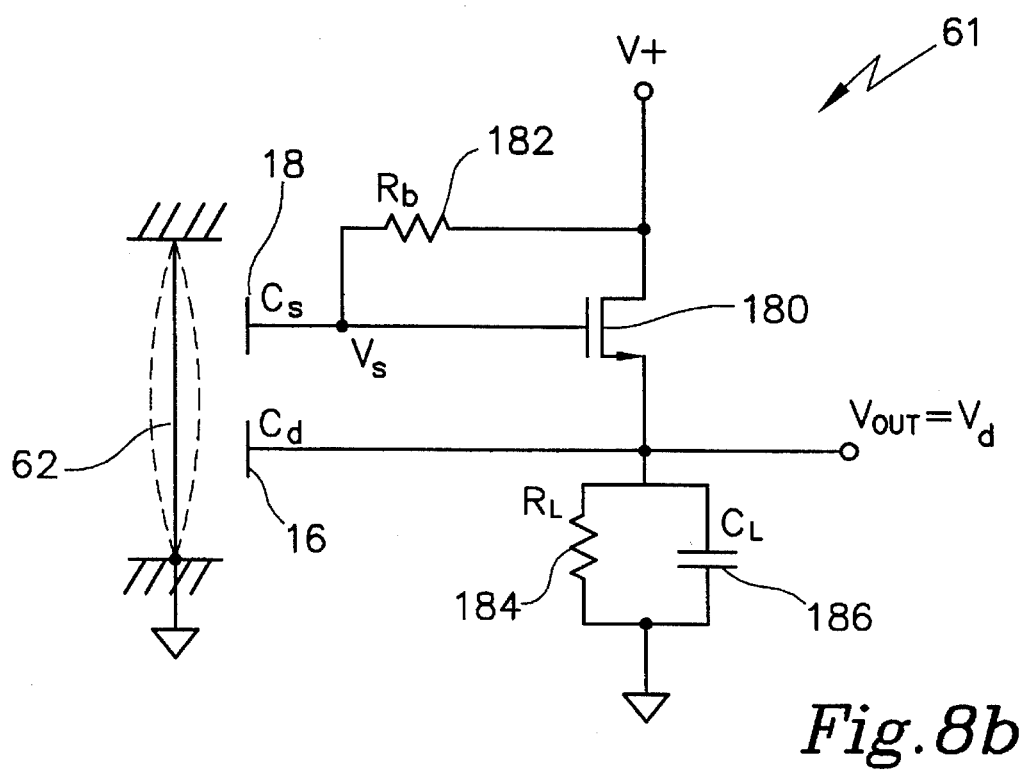

The phase similarity between sense electrode 18 and drive electrode 16 can be achieved with a source follower 180 of configuration 61 in FIG. 8b. The voltage gain of the source follower 180 circuit is less than one which is sufficient for an oscillator having high enough Q, since the current or power gain of this circuit is greater than one. Bias resistor 182, having a very large value is connected between the drain and the gate of transistor 180, to provide a gate bias. Load resistor 184 provides a negative feedback to stabilize the bias. Load capacitor 186 provides a lagging voltage component for driving beam 62 with a proper phase sufficient for oscillation. Capacitive sense electrode 18 is connected to the gate, and electrostatic drive electrode 16 is connected to the source, respectively, of transistor 180.

Figure 9A:
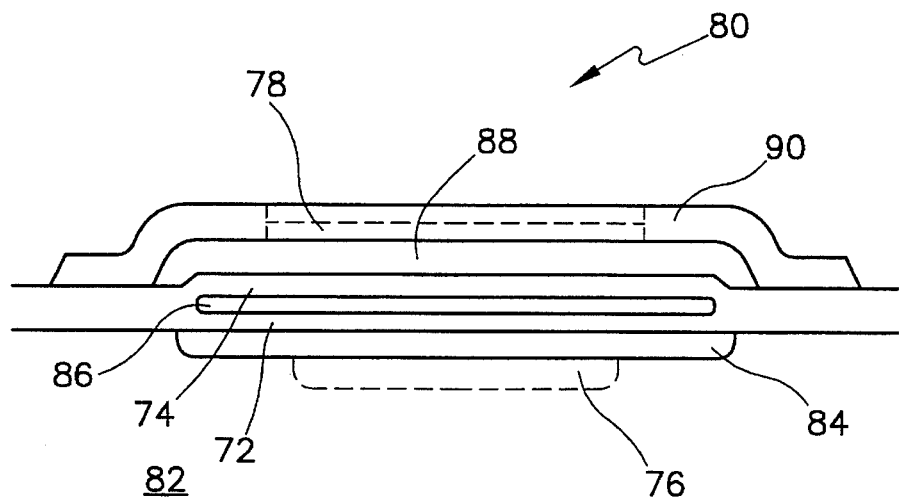
FIGS. 9a and 9b show the structure and electronics for a dual beam RIMS.

FIG. 9a is a side cross-section view of a double beam resonant integrated microbeam sensor 80. The most significant distinction of device 80 from the above described microbeam embodiments is the multiple beam structure. Device 80 may be micromachined using polysilicon films. Situated in substrate 82 is drive electrode 76. Proximate to substrate 82 is lower cavity 84, and adjacent to cavity 84 is a first microbeam 72 that is secured at both ends as it is an integral part of substrate 82. Parallel to first microbeam 72 is a second microbeam 74 which is a beam piggy-backed to beam 72. Microbeam 74 is secured at both ends as it is micromachined from the same piece of silicon as microbeam 72. A slit-like medial cavity 86 is formed between beams 72 and 74. Proximate to beam 74 is sense electrode 78 which is an integral part of a shell 90 which covers electrode 78 and beam 74. Between sensor 78 and beam 74 is an upper cavity 88. Shell 90 provides sealing integrity in cavity 88. Cavities 84, 86 and 88 are evacuated and form a common vacuum chamber.

Figure 9B:
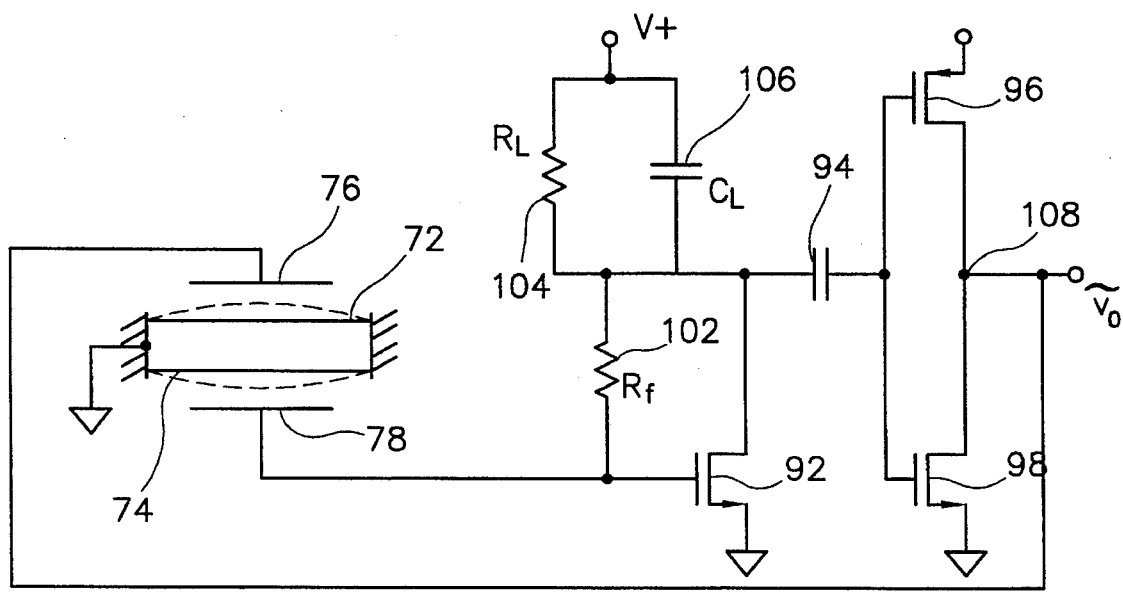

FIG. 9b shows an electronic circuit for double beam RIMS 80. Drive electrode 76 has a drive voltage signal causing microbeam 72 to vibrate in a mode at the resonant frequency of the beam. Beam 74 vibrates at the same frequency through mechanical coupling from beam 72. Beams 72 and 74 are connected to ground. The values of the resonant frequencies indicate an amount of longitudinal tension placed on beams 72 and 74 which may indicate a measurement of pressure, acceleration or other physical quantity. Sense electrode 78 is proximate to microbeam 74 and electrically detects the vibration of microbeam 74 and passes a vibration indicating signal on to a n-channel transistor 92. Transistor 92 amplifies the vibration indicating signal which is coupled with coupling capacitor 94 to a push-pull amplifier having a p-channel transistor 96 and a n-channel transistor 98. The common connection at the drain of transistor 96 and the drain of transistor 98, is an output 108 which is connected to drive electrode 76. The gate of transistor 92 is connected to high impedance feedback resistor 102. Resistor 102 is connected to the drain of transistor 92. The value of resistor 102 is such that biasing of transistor 92 in the linear region is maintained. Load resistor 104 and load capacitor 106 are connected in parallel, and connect the drain of transistor 92 to a positive (5 to 12 volt) supply V+. The values of resistor 104 and capacitor 106 are dependent on the resonant frequency of microbeams 72 and 74.

Figure 10A:
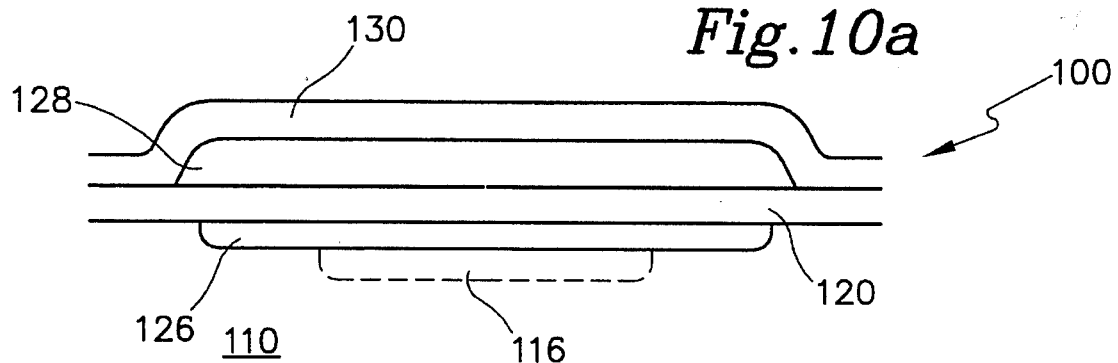
FIGS. 10a–d illustrate the structure and electronics for a triple beam RIMS.
Figure 10B:
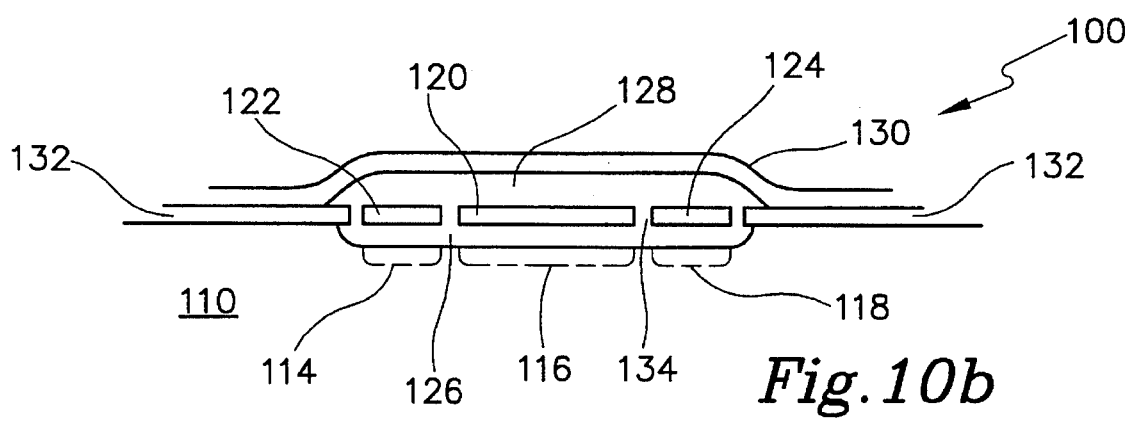
Figure 10C:
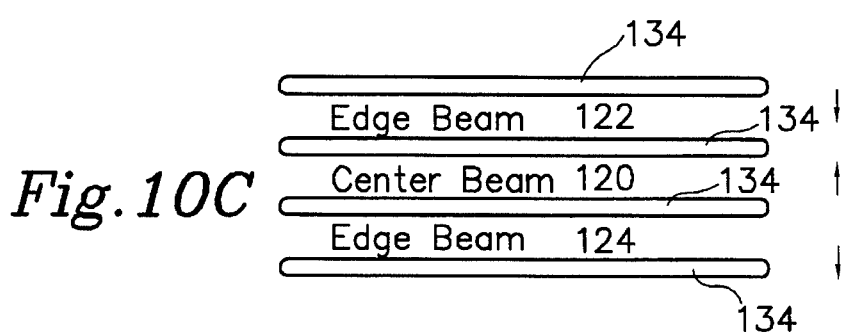

FIGS. 10*a–d* show a triple resonant integrated microbeam sensor 100. FIG. 10*a* is a side view of the structure of RIMS 100. Device 100 may be micromachined from silicon or other like workable material. Situated in substrate 110 is drive line or electrode 116 which is proximate to and drives center beam 120. Also situated in substrate 110 is sense electrode 114 which is proximate to and senses edge beam 122, and sense electrode 118 which is proximate to and senses edge beam 124. Electrodes are not shown in FIG. 10*a* because of the location of the cut for the cross-section view, but are shown in FIG. 10*b* which shows a cross-section view of a cut 90 degrees to that of FIG. 10*a*. Adjacent to drive and sense lines 114, 116 and 118 is a lower cavity 126. Next to and above the sense lines, are microbeam segments 120, 122 and 124 which are in a same silicon layer or plane 132. Beam 120 is shown in FIG. 10*a*. FIGS. 10*b* and 10*c* illustrate the physical relationship of beams 120, 122 and 124. Adjacent to beams 120, 122 and 124 is upper cavity 128. Over and sealing the volume, that is, lower cavity 126 and upper cavity 128, enclosing beams 120, 122 and 124 is shell 130. Cavities 126 and 128 are maintained in a vacuum. Beams 120, 122 and 124 are each secured at both ends of the respective triple microbeam. Center beam 120 has a width that is typically twice the width of each of edge beams 122 and 124. Beams 120, 122 and 124 are isolated from one another and partially from layer 132, by slits 134. Edge beams 122 and 124 vibrate in phase with each other and 180 degrees out of phase from center beam 120. Edge beams 122 and 124 mechanically couple vibration from center beam 120. The resonant frequency of the beams 120, 122 and 124 varies with the tension exerted on the beams via the attached ends of the beams. The tension is related to the magnitude of the physical phenomenon being measured and indicated by the value of the resonant frequency of the beams.

Figure 10D:
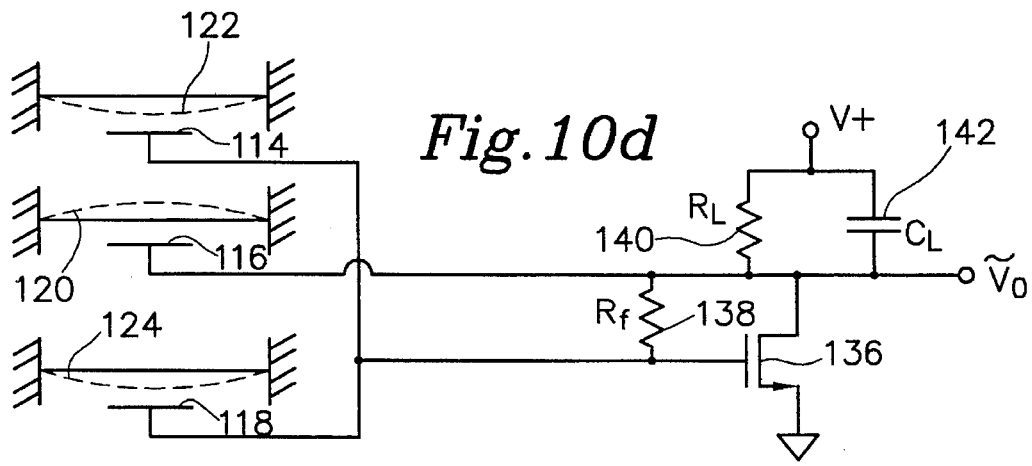

FIG. 10*d* is a schematic of the electronics for triple beam RIMS 100. Sense electrodes 114 and 118 are connected to the gate of n-channel transistor 136. Drive electrode 116 is connected to the output and drain of transistor 136. A high resistance feedback resistor 138 is connected between the gate and drain of transistor 136. Load resistor 140 is connected in parallel with load capacitor 142. Resistor 140 and capacitor 142 connect the drain of transistor 136 to a positive voltage supply V+, for setting the output level which may be varied.

Figure 11A:
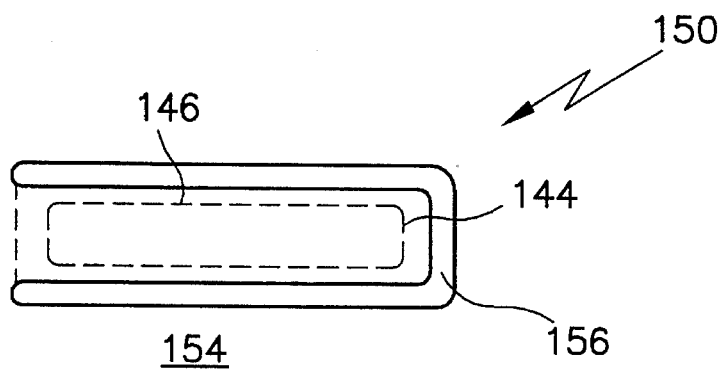
FIGS. 11a–c reveal cantilevered beam structures.
Figure 11B:
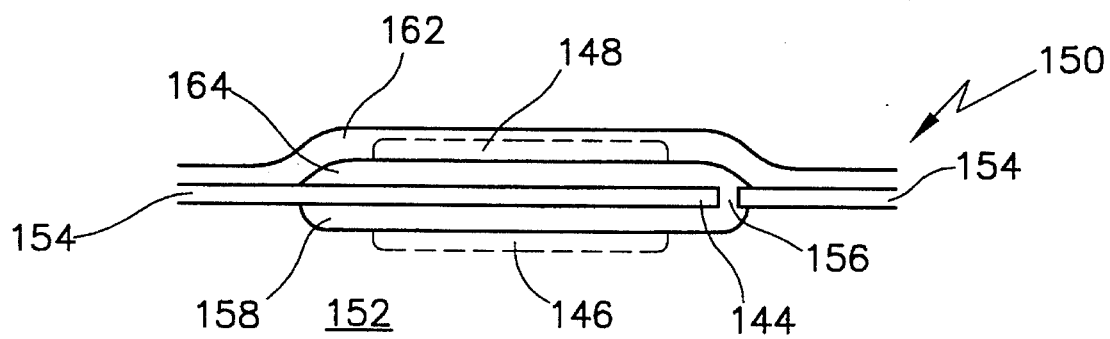

FIGS. 11*a* and 11*b* show a microbeam 144 that is connected to substrate 152 at only one end. Such microbeam structure 150 has application as a temperature sensor as the resonance frequency of structure 150 would change with respect to the temperature of structure 150. Microbeam structure 150 may also be used as an electromechanical filter described above. Drive electrode 146 is situated in substrate 152 for driving cantilever beam 144. Cantilever beam 144 is connected to ground and forms an electrode having capacitance relative to drive electrode 146, that varies according to distance between beam 144 and electrode 146. This distance varies as beam 144 moves or vibrates. Beam 144 is fabricated from a layer 154 with a gap 156. Between beam 144 and drive electrode 146 is a lower cavity 158. Formed over beam 144 is a shell 162 with an upper cavity 164. Beam 144 is in a vacuum in the space of upper and lower cavities 164 and 158. Sense electrode 148 is situated in shell 162 and has a capacitance relative to beam 144, that varies according to distance between beam 144 and electrode 146. FIG. 11*a* is a view looking at the plane of layer 154 without shell 162 over beam 144, revealing gap 156 that forms cantilever beam 144.

Figure 11C:
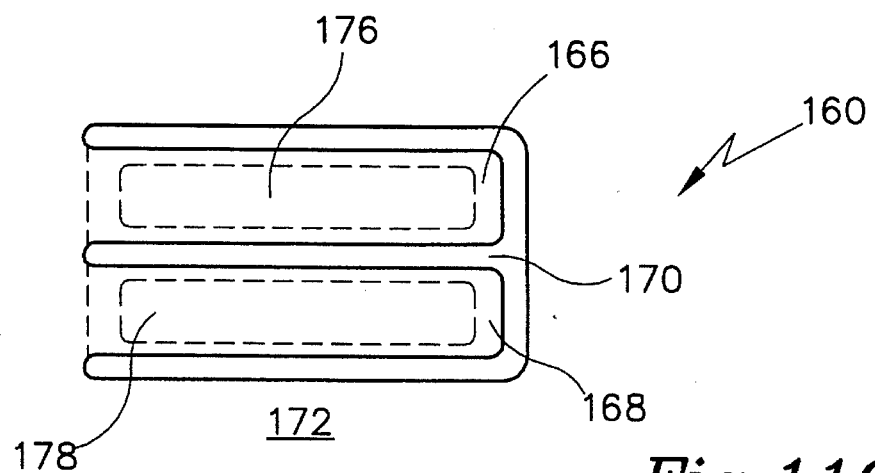

FIG. 11*c* shows configuration 160 having two cantilever beams 166 and 168 alongside each other, formed by gap 170 and situated on substrate 172. The paired cantilever beams 166 and 168 are mechanically coupled to each other as drive electrode 176 drives beam 166 which couples a vibration to beam 168 which vibrates and is sensed by sense electrode 178. Electrodes 176 and 178 are situated in substrate 172. Configuration 160 has a shell and upper and lower chambers like that of configuration 150 of FIGS. 11*a* and 11*b*.

Figure 12A:
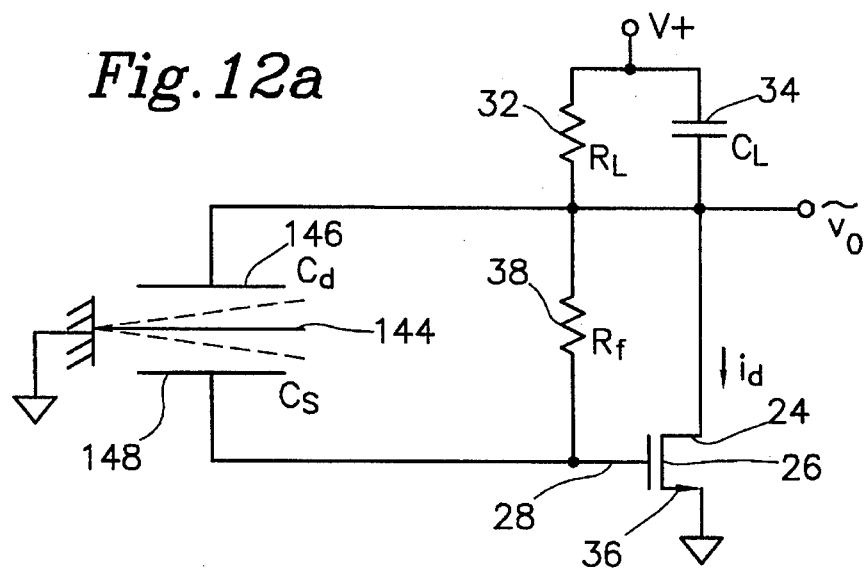
FIG. 12a is a schematic of electronics for the closed loop cantilevered beam structure.

FIG. 12*a* is a schematic of the electronics for the single cantilever beam 144 for use as a temperature sensor. The electronics is similar to that of configuration 10 in FIG. 1*a*. Beam 144 is driven by electrode 146 and sensed by electrode 148. The resonant frequency of beam 144 varies according to temperature by small shifts in the elastic modulus and thus is used as a temperature indicator.

Figure 12B:
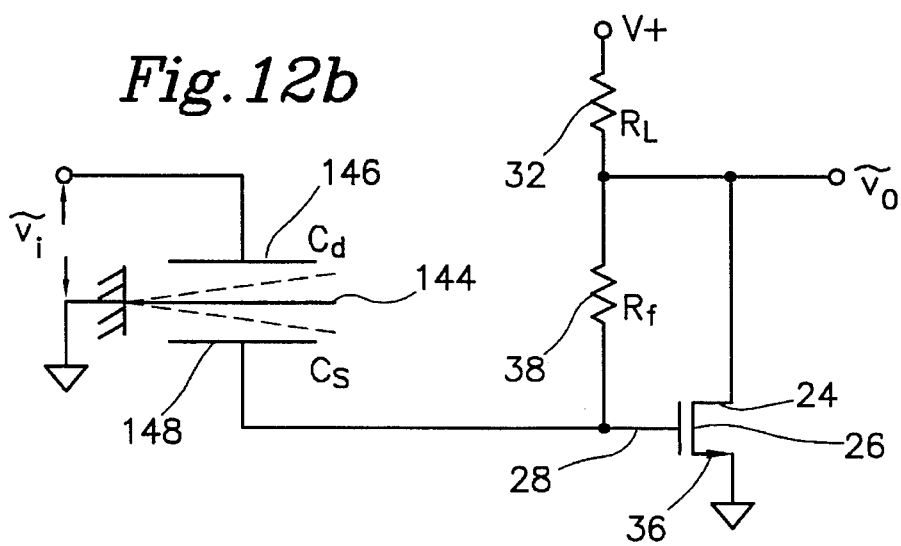
FIG. 12b is a schematic of the electronics for the open loop cantilevered beam structure.

The device of FIG. 12*b* is a filter at the resonant frequency of beam 144. The signal to be filtered goes to drive electrode 146 to excite beam 144. Signals having frequencies other than the resonant frequency of beam 144 do not vibrate beam 144 with any significance, and thus a negligible signal is detected by sense electrode 148. Signals having frequencies that are at the resonant frequency of beam 144 easily drive beam 144 into resonance and sense electrode detects a significant signal which is amplified by the associated electronics.

Figure 12C:
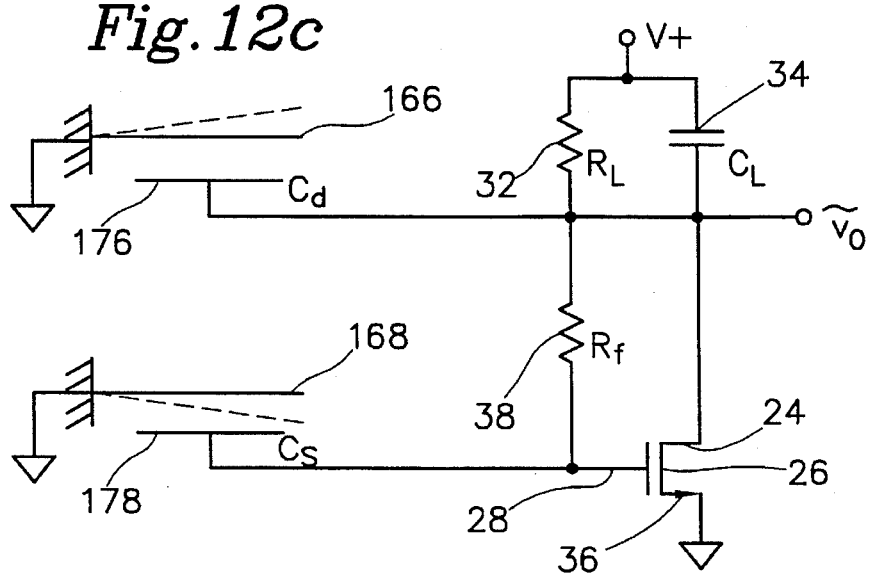
FIG. 12c is a schematic of the electronics for the closed loop cantilevered dual beam structure.

A schematic of the dual cantilever beams and associated electronics is revealed by FIG. 12*c*. The output of the electronics drives beam 166 at a resonant frequency which varies according to the temperature of the beam 166 apparatus. The vibration of beam 166, through mechanical coupling, drives beam 168 into a resonant vibration at a frequency which is the same as that of beam 166. The vibration of beam 168 is sensed by sense electrode 178 which inputs a signal to the electronics. The output of the electronics goes to driver 176 to sustain the vibration of beam 166 and in turn beam 168. Electrodes 176 and 178 are on the same side of beams 166 and 168. Beams 166 and 168 vibrate 180 degrees out of phase relative to each other, and the sensed signals are not only amplified but inverted for sending to drive electrode 176.

Figure 12D:
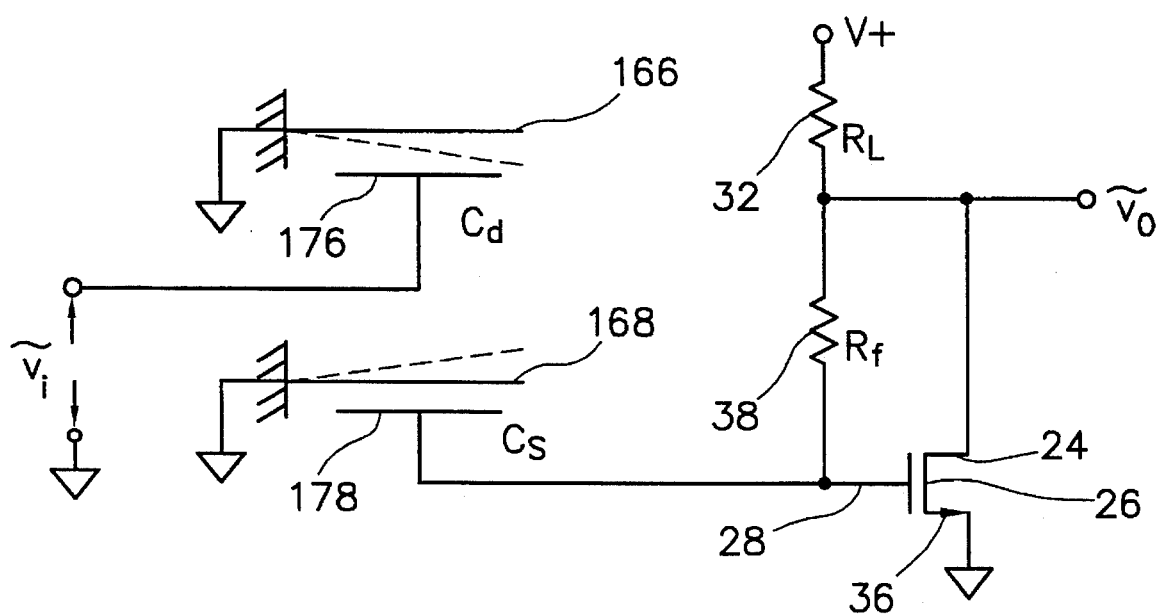
FIG. 12d is a schematic of the electronics for the open loop cantilevered dual beam structure.

A dual microbeam filter sensor is shown in FIG. 12*d*. The beam configuration is the same as that of FIG. 12*c*, except the electronics connections to electrodes 176 and 178 are different in that drive electrode 176 receives the signal that is to be filtered. This device is a filter at the resonant frequency of beam 166. The signal to be filtered goes to drive electrode 176 to drive beam 166. Signals having frequencies other than the resonant frequency of beam 166 do not vibrate beam 166 with any significance, and thus the vibration of beam 168 through mechanical coupling is insignificant, or nonexistent and an insignificant or no signal is detected by sense electrode 178. Signals having frequencies that are at the resonant frequency of beam 166 easily drive beam 166 into resonance and this vibration is coupled to beam 168 which vibrates at resonance. Vibration is detected by sense electrode 178 and that detected signal is inputted to the gate of transistor 26 for amplification. The output at drain 24 is the signal that is passed, which is at the frequency of resonance of beams 166 and 168. The electronics of the temperature sensing configurations of FIGS. 12a and 12c are similar to that of configuration 10 of FIG. 1a. The electronics of the filter configurations of FIGS. 12b and 12d are likewise similar except that load capacitor 34 is not incorporated as it is not needed because the circuit is merely an amplifier of the sensed vibration of the beam, as no oscillator is needed to maintain vibration of the beam.

We claim:

1. A transistor resonant integrated microbeam structure comprising:

a beam situated in a substrate and connected to a reference terminal, said beam having a first end and a second end fastened to the substrate, said beam having a tension or compression between the first and second ends and caused by bending of the substrate due to a magnitude of a physical parameter being measured, and said beam having a resonant frequency affected according to an amount of tension or compression of said beam, the resonant frequency indicating the magnitude of the physical parameter;

a first electrode situated on a first side of said beam, such that when said beam vibrates, a distance between said beam and said first electrode varies in synchronism with the resonant frequency, resulting in a first capacitance between said first electrode and said beam that varies inversely with the distance between said first electrode and said beam;

a second electrode situated on the first side of said beam, a distance between said beam and said second electrode varies proportionally to the distance between said beam and said first electrode, and a second capacitance between said second electrode and said beam varies in phase with the first capacitance; and a non-inverter having an input connected to said first electrode and an output connected to said second electrode; and wherein said non-inverter comprises:
a first transistor having a first terminal connected to said first electrode, a second terminal connected to the reference terminal, and a third terminal; and
an inverter having an input terminal connected to the third terminal of said transistor and having an output terminal connected to said second electrode.

2. The microbeam structure of claim 1 further comprising a feedback impedance having a first terminal connected to the first terminal of said first transistor and having a second terminal connected to said second electrode.

3. The microbeam structure of claim 2 wherein: said first electrode is a sense electrode; and said second electrode is a driver electrode.

4. The microbeam structure of claim 3 wherein said inverter comprises:

a second transistor having a first terminal connected to the third terminal of said first transistor, having a second terminal connected to the first terminal of said second transistor, and having a third terminal connected to a voltage terminal;

a third transistor having a first terminal connected to said second electrode, having a second terminal connected to the second terminal of said second transistor, and having a third terminal connected to the voltage terminal; and an impedance having a first terminal connected to the first terminal of said third transistor and having a second terminal connected to the reference terminal.

5. A transistor resonant integrated microbeam structure comprising:

a first beam situated in a substrate and connected to a reference terminal, said first beam having a first end and a second end fastened to the substrate, said first beam having a tension or compression between the first and second ends which is caused by a bending of the substrate due to a magnitude of a physical parameter being measured, and said first beam having a resonant frequency dependent upon an amount of tension or compression of said first beam, the resonant frequency indicating the magnitude of the physical parameter;

a second beam situated proximate to said first beam and connected to the reference terminal, said second beam having a first end and a second end fastened at the first and second ends of said first beam, said second beam being parallel to and at a distance from said first beam, said second beam having a tension or compression like that of said first beam, said second beam being mechanically coupled to said first beam so when said first beam vibrates, said second beam vibrates at a resonant frequency that is the same as the resonant frequency of said first beam, and vibrates 180 degrees out of phase relative to said first beam;

a first electrode situated proximate to a first side of said first beam which is opposite to a second side of said first beam that is proximate to said second beam, said first electrode at a first distance that varies with respect to said first beam when said first beam vibrates, and said first electrode having a first capacitance relative to said first beam, that varies inversely to the first distance, at the resonant frequency of said first beam;

a second electrode situated proximate to a first side of said second beam opposite to a second side of said second beam that is proximate to said first beam, said second electrode at a second distance that varies with respect to said second beam when said second beam vibrates, and said second electrode having a second capacitance relative to said second beam, that varies inversely to the second distance, at the resonant frequency of said second beam; and a noninverter having an input connected to said second electrode and an output connected to said first electrode; and wherein said noninverter comprises:
a first transistor having a first terminal connected to said second electrode, a second terminal connected to the reference terminal and having a third terminal;
a load impedance having a first terminal connected to the third terminal of said first transistor and having a second terminal connected to a first voltage terminal; and
an inverter having an input terminal connected to the third terminal of said first transistor and having an output terminal connected to said first electrode.

6. The microbeam structure of claim 5 further comprising a feedback impedance having a first terminal connected to the third terminal of said first transistor and having a second terminal connected to the first terminal of said first transistor.

7. The microbeam structure of claim 5 wherein: said first electrode is a driver electrode; and said second electrode is a sensor electrode.

8. The microbeam structure of claim 7 wherein said inverter comprises:

a second transistor having a first terminal, having a second terminal connected to the output terminal of said inverter and having a third terminal connected to a second voltage terminal;

a third transistor having a first terminal connected to the first terminal of a said second transistor, having a second terminal connected to the reference terminal, and having a third terminal connected to the second terminal of said second transistor; and an input impedance having a first terminal connected to the input terminal of said inverter and having a second terminal connected to the first terminal of said second and third transistors.

9. A transistor resonant integrated microbeam structure comprising:

a first beam, capable of vibrating, situated in a substrate;

a second beam, capable of vibrating, situated in the substrate, adjacent to said first beam;

a third beam, capable of vibrating, situated in the substrate, adjacent to said second beam;

a first electrode, proximate to said first beam, having a capacitance relative to said first beam, the capacitance having a value that varies with vibrating movement of said first beam;

a second electrode, proximate to said second beam, having a capacitance relative to said second beam, the capacitance having a value that varies with vibrating movement of said second beam;

a third electrode, proximate to said third beam, having a capacitance relative to said third beam, the capacitance having a value that varies with vibrating movement of said third beam; and an inverter having an input connected to said first and third electrodes and an output connected to said second electrode; and wherein:

said first, second and third beams have ends fastened to the substrate and connected to a reference terminal, have a resonant frequency that varies relative to a tension or compression applied at the ends to said first, second and third beams, the tension or compression caused by a physical phenomenon having a magnitude, and the resonant frequency being an indication of the magnitude of the physical phenomenon.

10. The microbeam structure of claim 9 wherein said inverter comprises:

a transistor having a first terminal connected to the input of said inverter, a second terminal connected to a reference terminal and a third terminal connected to the output of said inverter; and a load impedance having a first terminal connected to the third terminal of said transistor and having a second terminal connected to a voltage terminal.

11. The microbeam structure of claim 10 wherein:

said first and third electrodes are capacitive sensing electrodes that sense vibrating movement of said first and third beams, respectively;

said second electrode is an electrostatic driving electrode that drives said second beam to vibrating movement at the resonant frequency; and said first and third beams are driven to vibrating movement at the resonant frequency through a mechanical coupling because of proximity to said second beam when vibrating.

12. The microbeam structure of claim 11 further comprising a feedback resistor having first and second terminals connected to the first and third terminals, respectively, of said transistor.

13. The microbeam structure of claim 12 wherein:

said transistor is an N-channel field effect transistor; and the first, second and third terminals of said transistor are a gate, a source and a drain, respectively.

14. The microbeam structure of claim 12 wherein:

said transistor is a bipolar transistor; and the first, the second, and third terminals of said transistor are a base, an emitter and a collector, respectively.

* * * * *